United States Patent
Taras, Jr. et al.

(10) Patent No.: US 6,454,156 B1
(45) Date of Patent: Sep. 24, 2002

(54) METHOD FOR CLOSING CORE PRINTOUT HOLES IN SUPERALLOY GAS TURBINE BLADES

(75) Inventors: Michael A. Taras, Jr., Pompano Beach, FL (US); Stephen M. Sabol, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/602,215

(22) Filed: Jun. 23, 2000

(51) Int. Cl.[7] .................................................. B23P 6/00
(52) U.S. Cl. ........................ 228/165; 228/119; 29/889.1
(58) Field of Search ........................ 228/119–165, 161, 228/121, 171, 248.1, 124.7; 164/3; 29/889.1, 402.07, 402.08

(56) References Cited

U.S. PATENT DOCUMENTS

| | | | | |
|---|---|---|---|---|
| 3,487,530 A | * | 1/1970 | Ely | |
| 3,626,568 A | * | 12/1971 | Silverstein et al. | |
| 4,050,133 A | * | 9/1977 | Cretella et al. | |
| 4,589,824 A | * | 5/1986 | Kozlin | |
| 4,662,806 A | * | 5/1987 | Reed | |
| 5,755,030 A | * | 5/1988 | Fraser | |
| 4,866,828 A | * | 9/1989 | Fraser | |
| 4,953,777 A | * | 9/1990 | Griffith et al. | |
| 5,067,234 A | * | 11/1991 | Fraser | |
| 5,111,570 A | * | 5/1992 | Baumgarten | |
| 5,343,619 A | * | 9/1994 | Lardellier | |
| 5,407,326 A | * | 4/1995 | Lardellier | |
| 5,425,407 A | * | 6/1995 | Archuleta et al. | |
| 6,199,746 B1 | * | 3/2001 | Dupree et al. | |

* cited by examiner

Primary Examiner—M. Alexandra Elve
Assistant Examiner—Jonathan Johnson

(57) ABSTRACT

A hole (3) formed in a superalloy turbine blade (12) is sealed by providing a superalloy plug (4), machining the hole to be of a configuration can receive the plug therein, and bonding the plug to the turbine blade. The plug can be of a threaded or unthreaded configuration and can be of a tapered or straight configuration. The plug is bonded to the hole by applying a bonding catalyst to one or both of the plug and the hole or by positioning the bonding catalyst therebetween, and providing appropriate treatment to the bonding catalyst, such as heating or other treatment, to cause the bonding catalyst to form a bond between the plug and the turbine blade to form a joint therebetween. Any of a variety of known bonds can be employed to form the joint. The plug additionally may be pre-cooled prior to insertion thereof into the hole in the turbine blade, or alternatively may be of a coefficient of thermal expansion that is greater than that of the turbine blade.

26 Claims, 2 Drawing Sheets

METHOD FOR CLOSING CORE PRINTOUT HOLES IN SUPERALLOY GAS TURBINE BLADES

BACKGROUND OF THE INVENTION

1. Field of the Invention

The present invention relates generally to gas turbine blades and, more particularly, to hollow gas turbine blades formed by a casting operation that leaves core printout holes therein. Specifically, the invention relates to a method for closing core printout holes in superalloy gas turbine blades.

2. Description of the Related Art

Turbine blades are employed in different regions of combustion turbine engines. As is known in the relevant art, such combustion turbine engines typically include a compressor stage, a combustor stage, and a turbine stage. Air is drawn into the engine and compressed by the compressor stage, with fuel being mixed with the compressed air and the fuel/air mixture being combusted in the combustor stage. The hot combusted gases then flow past the turbine stage and thereafter exit the engine.

The compressor and turbine stages of the engine typically include a plurality of turbine blades that are mounted on a common rotating shaft. The compressor and turbine stages each additionally include one or more stationary vanes or stators that include non-moving turbine blades that cooperate with the turbine blades mounted on the rotating shaft to compress air and to derive mechanical power from high velocity gases.

Since the turbine blades, both moveable and stationary, operate in a high temperature environment, such blades are typically formed in a casting operation to include a hollow cavity. The cavity receives cooling air during operation of the combustion engine to provide a cooling effect to the blades and to control the operating temperature thereof. The hollow cavity is cast into the blade by providing a core within the blade mold. The core is retained within the mold by one or more ceramic rods that extend from the core to the inner surface of the mold itself for retaining the core in a given position within the mold. A molten alloy is then poured into the mold with the core disposed therein, whereby the core prevents the flow of the molten alloy within certain regions of the mold and ultimately results in a hollow region within the finished turbine blade that can receive the beneficially cooling air therein. During the casting operation, however, the ceramic rods that retain the core in position within the mold likewise prevent the flow of the molten alloy such that the finished turbine blade additionally includes one or more core printout holes resulting from the legs. Such core printout holes must be sealed prior to use of the turbine blade, otherwise the cooling air introduced into the hollow core will undesirably flow out of the printout hole without providing the needed beneficial cooling effect to the turbine blade.

Previous methods and apparatuses employed to seal such core printout holes have met with only limited success due to the difficulty of forming a seal having sufficient internal strength and being bonded strongly enough to the turbine blade to withstand the typical operating environment. As is known in the relevant art, such turbine blades typically are manufactured out of a "superalloy" that typically is of a nickel base that is alloyed with other materials such as aluminum, titanium, and chromium in various combinations and proportions, although numerous other alloys can be used for the manufacture of turbine blades. Such superalloys typically include nickel aluminide intermetallic crystals known as a "gamma prime" that are extremely brittle and are precipitated within a solid solution that makes up the turbine blade. Welding of such nickel-based superalloy materials is extremely difficult and often results in cracking and microfissuring due to strain age and liquation cracking. Any such welding is almost exclusively done with low strength weld filler materials since the higher strength fillers are more prone to cracking. While relatively low strength filler materials can, in certain circumstances, be employed to fill core printout holes without welding, such materials typically do not possess the strength of the base metal of the turbine blade, which thus often limit the utility of turbine blades having core printout holes that are repaired in such fashion. While Liquid Phase Diffusion Sintering (LPDS) methods can be employed in sealing core printout holes, such methods are of limited strength and are often expensive and require reworking and non-destructive examination to determine the adequacy thereof. A need thus exists for a method of sealing core printout holes whereby the seal is of sufficient internal strength and is attached to the blade securely enough to withstand the punishing environment typically found within the interior of a combustion turbine engine.

SUMMARY OF THE INVENTION

In accordance with the foregoing, an aspect of the present invention is to provide a method of closing a core printout hole in a superalloy turbine blade, the general nature of which can be stated as including the steps of providing a superalloy plug having a threaded peripheral configuration, machining the hole to have a threaded configuration that is structured to receive the plug therein, threading the plug in the hole, and bonding the plug to the turbine blade.

Another aspect of the invention is to provide a method of closing a core printout in a superalloy turbine blade, the general nature of which can be stated as including the steps of providing a superalloy plug having a peripheral configuration forming the hole to have a configuration that is structured to receive the plug therein, receiving the plug in the hole applying a bonding catalyst to at least one of the plug and the turbine blade, and forming a joint between the plug and the turbine blade.

A further aspect of the present invention is to provide a method of closing a core printout hole in a superalloy turbine blade having a first coefficient of thermal expansion, the general nature of which can be stated as including the steps of providing a superalloy plug having a peripheral configuration and having a second coefficient of thermal expansion that is greater than the first coefficient of thermal expansion, forming the hole to have a configuration that is structured to receive the plug therein, receiving the plug in the hole, and bonding the plug to the turbine blade.

BRIEF DESCRIPTION OF THE DRAWINGS

The preferred embodiments of the invention, illustrative of the best modes in which the applicants have contemplated applying the principles of the invention, are set forth in the following description and are shown in the drawings and are particularly and distinctly pointed out and set forth in the appended claims.

Similar numerals refer to similar parts throughout the specification.

DESCRIPTION OF THE PREFERRED EMBODIMENTS

The term "superalloy" as used herein refers generally to a metallic alloy having a base of nickel or other appropriate material that is alloyed with aluminum, titanium, chromium, and other appropriate materials in various combinations and proportions, and may or may not include a nickel aluminide intermetallic material or other gamma prime material therein, although the term "superalloy" should be interpreted to refer to any alloy or material with sufficient thermal and mechanical properties to serve in a gas turbine blade application. Moreover, the term "superalloy" as applied to a plug refers to an alloy or other material that matches or is similar to the blade base metal alloy, and is further interpreted to refer to any such alloy or material having sufficient thermal and mechanical properties to serve as a bonded plug material.

The terms "blade" and "turbine blade" refer both to moveable turbine blades as well as stationary vanes or stators employed in gas turbine engines.

The term "bond" as used herein refers to a joint and the formation of such a joint between a turbine blade and a plug, the joint being formed in conjunction with the use of a mechanical joint and/or with the use of a bonding catalyst or other appropriate material that is interposed between or extends across the turbine blade and the plug. The joint can be any of a wide variety of known joints such as braze joints, diffusion braze joints, Transient Liquid Phase (TLP) joints, Liquid Phase Diffusion Sintering (LPDS) joints, diffusion bond joints, or other such joints.

The term "bonding catalyst" as used herein refers to any of a variety of known materials employed in forming a bond and including materials such as braze material and superalloy material that typically includes (but is not in all circumstances required to include) a melting point depressant such as boron, silicon, phosphorus, or other appropriate material in various combinations and proportions, and being in the form of a putty, paste, slurry, powder, plating, coating, foil, or other appropriate form, whether or not with the addition of a binder material therewith.

Figure 1:
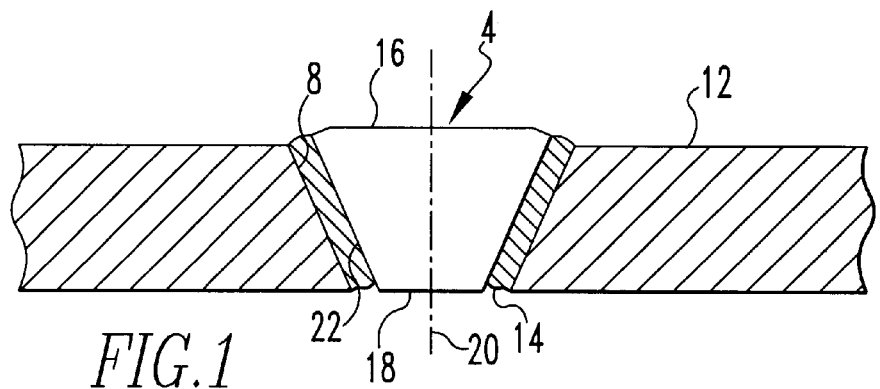
FIG. 1 is a cutaway side view of a first type of plug used to seal a hole in a turbine blade in accordance with the method of the present invention.

A first embodiment of the method of the present invention is illustrated in FIG. 1. More specifically, a plug 4 is employed to seal a hole 8 formed in a turbine blade 12. As is known in the relevant art, the turbine blade 12 is formed out of a superalloy. The plug 4 is advantageously also formed out of a superalloy, either a superalloy that matches the superalloy of the turbine blade 12, or one that is compatible therewith. While the hole 8 most typically results at least initially from a ceramic rod (not shown) employed in supporting a core (not shown) during the casting process, it is understood that the methods set forth herein may be applied to other holes and voids formed in the turbine blade 12 by different phenomena.

A joint 14 extends between the turbine blade 12 and the plug 4 and bonds the plug 4 in a fixed position with respect to the turbine blade 12. The joint 14 can be any of a wide variety of known joints such as braze joints, diffusion braze joints, Transient Liquid Phase (TLP) joints, Liquid Phase Diffusion Sintering (LPDS) joints, diffusion bond joints, and other appropriate joints.

The plug 4 is of a substantially frusto-conic shape and thus includes a substantially circular and planar external surface 16 and a substantially circular and planar internal surface 18 at opposite ends thereof. The external surface 16 faces generally away from the turbine blade 12 when the plug 4 is installed in the hole 8, and the internal surface 18 faces away from the external surface 16 and toward the cavity formed internally within the turbine blade 12. A longitudinal axis designated by the line 20 extends longitudinally through the center of the plug 4 and is oriented substantially perpendicular with the external and internal surfaces 16 and 18. It can be seen therefore, that the cross-section of the plug 4, as measured through a plane oriented perpendicular with the longitudinal axis 20, is substantially circular.

The plug 4 additionally includes an peripheral surface 22 extending between the external and internal surfaces 16 and 18. The peripheral surface 22 is the surface of the plug 4 that is bonded by the joint 14 to the surface formed on the turbine blade 12 by the hole 8. It is understood, however, that the bonding catalyst employed in forming the joint 14 may have been applied or may flow after heating or other treatment such that the bonding catalyst and thus the resulting joint 14 additionally extends at least partially across the turbine blade 12 and/or the external and/or internal surfaces 16 and 18 of the plug 4 depending upon the specific needs of the particular application.

The plug 4 is of a generally tapered configuration with respect to the longitudinal axis 20 and has a circular cross-section with regard to a plane oriented perpendicular with the longitudinal axis 20. Moreover, the peripheral surface 22 is generally smooth and is arcuate about its circumference. The peripheral surface 22 of the plug 4 thus gives the plug 4 a peripheral configuration that is generally tapered and arcuate with respect to the longitudinal axis 20 and is generally smooth. It is understood, however, that in some applications the plug 4 potentially may be untapered and be of a substantially cylindrical configuration, depending upon the specific needs of the particular application, without departing from the spirit of the present invention.

As can be seen in FIG. 1, the hole 8 is generally configured to be of a configuration that is complementary to the peripheral configuration of the plug 4, whereby the hole 8 is structured to at least partially receive the plug 4 therein. The hole 8 is thus of a substantially frusto-conic configuration that generally matches the peripheral configuration of the plug 4.

The joint 14 extending between the plug 4 and the turbine blade 12 can be any of a wide variety of joints as set forth herein that serve to bond the plug 4 to the turbine blade 12. The joint 14 is formed by first applying a bonding catalyst to the peripheral surface 22 of the plug 4, to the surface defined by the hole 8, or to both, and positioning the plug 4 within the hole 8 such that the peripheral surface 22 is disposed closely adjacent and in register with the hole 8.

In this regard, it is understood that the space or gap between the peripheral surface 22 of the plug 4 and the turbine blade 12 that is occupied by the joint 14 is greatly exaggerated in size in FIG. 1, as are the corresponding spaces or gaps shown as to other embodiments of the present invention in FIGS. 2–7. More specifically, and as is known in the relevant art, the gap between the peripheral surface 22 and the turbine blade 12 should be approximately within the range of 1–4 mils (0.001–0.004 inches) depending upon the type of bond formed by the joint 14, and may likewise be both greater and smaller than this range if the technology of the bond employed for the joint 14 so requires or permits.

The core print hole that typically results from the ceramic rod is of an approximately cylindrical configuration and is relatively rough in relation to gaps between the plug 4 and the turbine blade 12 that are on the order of 1–4 mils. The hole 8 that receives the plug 4 prior to formation of the joint 14 thus is machined or otherwise worked to achieve a smooth, frusto-conic configuration that can receive the plug 4 whereby the gap therebetween is of an appropriate size to achieve an appropriate bond therebetween.

As set forth herein, the bonding catalyst can be any of a wide variety of materials such as braze material and superalloy material, and in the case of superalloy material are typically tailored to be close to the composition of the superalloy used to manufacture the turbine blade 12 and the plug 4, or at least preferably compatible therewith. Moreover, the bonding catalyst may take any of many physical forms whereby the bonding catalyst may be applied to one or both of the peripheral surface 22 and the hole 8, may be positioned and held therebetween, or may be plated or otherwise formed thereon. As indicated herein, the bonding catalyst typically includes a melting point depressant such as boron, silicon, or phosphorus, but may be free of such a melting point depressant depending upon the specific makeup of the bonding catalyst.

Depending upon the specific type of bond that is to be formed by the joint 14, the bonding catalyst is heated in a known fashion by a vacuum furnace or other appropriate apparatus, and during such heating the plug 4 and the turbine blade 12 are generally similarly heated. Moreover, pressure may be applied between the plug 4 and the turbine blade 12 as appropriate to the type of joint 14 that is desired to be formed.

The heating occurs in a known manner, whether isothermally or in another fashion, to transform the bonding catalyst between the peripheral surface 22 and the turbine blade 12 into the joint 14. The turbine blade 12 and the plug 4, as well as the interface of the joint 14 with the turbine blade 12 and the plug 4, may then be ground or otherwise worked as appropriate to provide the desired surface finish and surface continuity.

Regardless of the heating procedure employed in forming the joint 14, the temperature to which the bonding catalyst, plug 4, and turbine blade 12 are heated is lower than the melting temperatures of the plug 4 and the turbine blade 12. Depending upon the type of bond desired, the heating may continue until a substantial portion of any melting point depressant in the bonding catalyst has diffused from the joint 14 into the plug 4 and the turbine blade 12.

Depending further upon the type of bond that is desired to be formed by the joint 14, the plug 4 may be compressed into the hole 8 at a given known pressure or range of pressures. Such pressure can be applied by a fixture, or alternatively may be supplied with a press fit that is performed prior to heating. Such a press fit would require a press (not shown) of the type known and understood in the relevant art.

Still alternatively, compression between the plug 4 and the turbine blade 12 can be achieved by providing a plug 4 having a coefficient of thermal expansion that is greater than the coefficient of thermal expansion of the turbine blade 12, and by heating both the plug 4 and the turbine blade 12. The difference in the coefficients of thermal expansion causes the plug 4 to expand to a size greater than the hole 8, with the plug 4 correspondingly becoming compressed within the hole 8 and thus providing compressive force between the peripheral surface 22 and the turbine blade 12.

Again still alternatively, compression between the plug 4 and the turbine blade 12 can be achieved by simply cooling the plug 4 prior to positioning the plug 4 in the hole 8. More specifically, if the plug 4 is manufactured to be oversized, or even is larger than the hole 8, and the oversized plug 4 is treated with liquid nitrogen or other cryogenic substance, the oversized plug 4 will thermally contract. The cooled oversized plug 4 may then be positioned in the hole 8 of the turbine blade 12 that is at room temperature or at an elevated temperature, and the bonding process commenced. The oversized plug 4 thus can be configured such that a compressive force exists between it and the turbine blade 8 when the plug 4 and the turbine blade 8 reaches the same temperature. Such a method permits the plug 4 and the turbine blade 8 to be manufactured out of the same material, and such identity of materials can even permit the joint 14 to be a diffusion bond which does not specifically require the use of a bonding catalyst. As such, the pre-cooling of the plug 4 provides even greater versatility in configuring the plug 4, the turbine blade 12, and the joint 14.

In this regard, it is understood that the angle of taper of the plug 4 is configured in conjunction with the different coefficients of thermal expansion or with the pre-cooling of the plug 4 to resist the compressive forces from forcing the tapered plug 4 out of the hole 8 during heating. As is known in the relevant art, the compressive force between the plug 4 and the turbine blade 12 can be divided into components normal to and parallel with the tapered surface of the hole 8. The parallel component determines the amount of force having a tendency to push the plug out of the hole, and the normal component (along with the appropriate coefficients of friction) determine the frictional force tending to retain the plug 4 in the hole 8 and resist pushing the plug 4 out of the hole. It can be seen that by adjusting the angle of taper of the plug 4, the normal and parallel components of the compressive force can be configured such that the risk of the plug 4 being pushed out of the hole 8 is minimized.

It can likewise be seen that the amount of compression between the plug 4 and the turbine blade 12 can be manipulated by selecting specific superalloy out of which the plug 4 is manufactured to have a given coefficient of thermal expansion in light of the temperature at which the heating will occur and the coefficient of thermal expansion of the turbine blade 12. A pre-cooling temperature of an oversized plug 4 can be similarly selected.

Once the joint 14 has been formed sufficiently to create the desired bond between the plug 4 and the turbine blade 12, the plug 4 is fixedly retained in the hole 8 and the hole 8 is thus sealed thereby. The plug 4 is advantageously of substantially the same strength and heat resistance as the turbine blade 12, which substantially improves the reliability of the turbine blade 12 during use. Moreover, the plug 4 is bonded to the turbine blade 12 in a fashion other than by welding, thus avoiding the problems inherent in attempting to weld a superalloy. The method of the present invention thus achieves benefits beyond those previously known in the relevant art.

Figure 2:
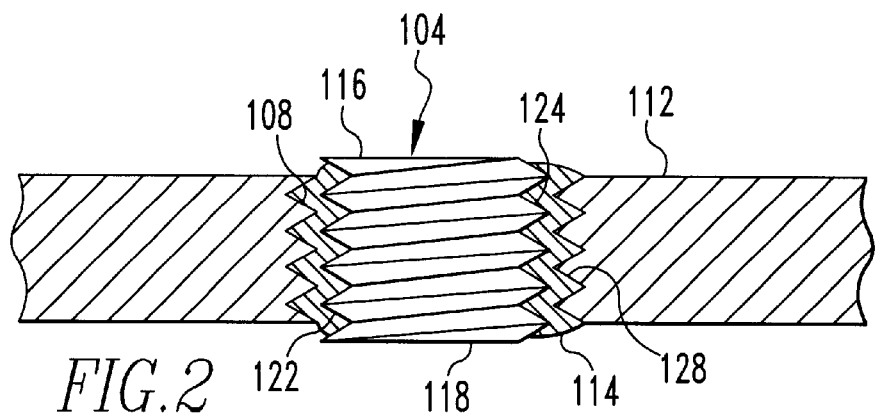
FIG. 2 is a cutaway side view of a second type of plug used to seal a hole in a turbine blade in accordance with the method of the present invention.

A second embodiment of the method of the present invention is indicated generally at FIG. 2. The method embodied in FIG. 2 is similar to that depicted in FIG. 1, except that the plug 104 that is employed to seal the hole 108 in the turbine blade 112 includes a peripheral surface 122 having a plurality of external threads 124 formed thereon. Similarly, the turbine blade 112 is formed with a plurality of internal threads 128 formed at the hole 108 that cooperate threadably with the external threads 124. Moreover, the plug 104 is not tapered, but rather is of an approximately cylindrical configuration such that the external surface 116 and internal surface 118 are both substantially circular and planar surfaces that are of substantially the same diameter.

The cooperative external and internal threads 124 and 128 serve as a mechanical lock that retains the plug 104 in fixed relation with the turbine blade 112, although other types of mechanical locks other than cooperative threading may be employed without departing from the spirit of the present invention. The plug 104 can be threaded into the hole 108 by grasping an extended top on the plug 104 that can be ground away after formation of the joint 114. Alternatively, an appropriate socket can be formed on the external surface 116 that can receive an corresponding tool such as a miniature screwdriver, or other appropriate methods may be employed in threading the plug 104 into the hole 108.

The external threads 124 are formed on the peripheral surface 122 by any of a variety of known methods, and may include formation by electro-discharge machinery, as well as other methodologies. The internal threads 128 can likewise be formed in numerous fashions including the employment of electro-discharge machinery as well as other methodologies.

The internal threads 128 are configured to receive the plug 104, which has a threaded peripheral configuration, whereby the external threads 124 are cooperatively received with the internal threads 128. Either or both of the hole 108 and the peripheral surface 122 have the bonding catalyst applied thereto, and the joint 114 is formed in a known fashion to bond the plug 104 to the turbine blade 112. The plug 104 additionally may be pre-cooled or may have a coefficient of thermal expansion greater than that of the turbine blade 112.

Figure 3:
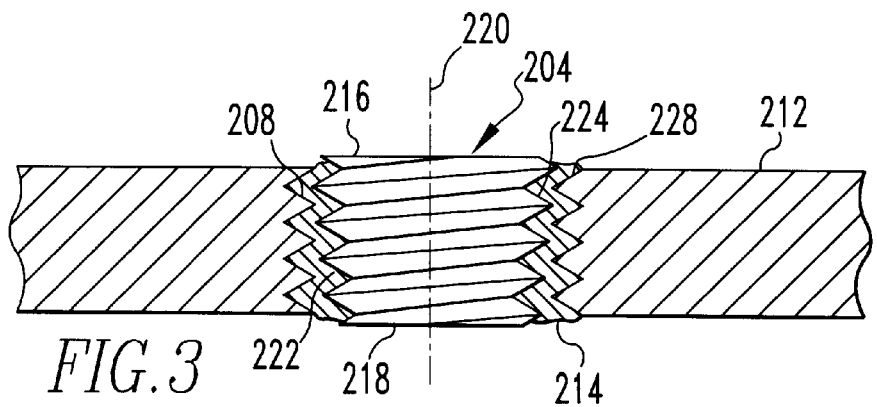
FIG. 3 is a cutaway side view of a third type of plug used to seal a hole in a turbine blade in accordance with the method of the present invention.

Another embodiment of the method of the present invention is depicted generally in FIG. 3. The method depicted generally in FIG. 3 is similar to that depicted in FIG. 2, except that the external threads 224 disposed on the peripheral surface 222 of the plug 204 are tapered threads instead of straight threads. As is known in the relevant art with regard to such threading, the hole 208 in the turbine blade 212 is substantially cylindrical and includes internal threads 228 that are substantially straight threads that can receive the tapered external threads 224 of the plug 204 therein. Such tapered external threads 224 cause the plug 204 to be compressed within the hole 208 of the turbine blade 212 depending upon the torque with which the plug 204 is inserted into the hole 208.

It is likewise understood that the plug 204 is of at least a slightly tapered configuration with respect to a longitudinal axis 220 whereby the external surface 216 and the internal surface 218 are both substantially circular and planar surfaces, yet the external surface 216 is of at least a nominally larger diameter than the internal surface 218.

The bonding catalyst is applied to one or both of the plug 204 and the hole 208 or is interposed therebetween, and the bonding catalyst is then heated or otherwise treated in a prescribed fashion to create a desired bond that forms the joint 214 between the plug 204 and the turbine blade 212. The plug 204 additionally may be pre-cooled or may be configured to have a coefficient of thermal expansion that is greater than that of the turbine blade 212. The tapered and threaded peripheral configuration of the plug 204 thus advantageously is threadably received in the hole 208 and is at least nominally compressed therein prior to formation of the joint 214.

Figure 4:
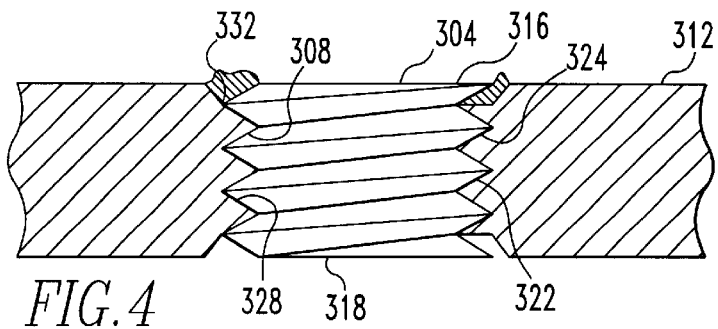
FIG. 4 is a cutaway side view of a fourth type of plug used with a bonding catalyst to seal a hole in a turbine blade in accordance with the method of the present invention.
Figure 5:
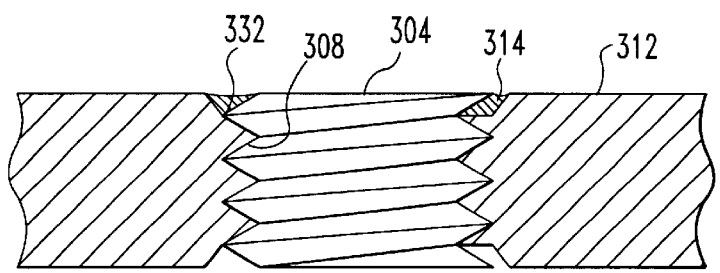
FIG. 5 is a view similar to FIG. 4, except subsequent to heating of the bonding catalyst.

A fourth embodiment of the method of the present invention is depicted generally in FIGS. 4 and 5. The fourth embodiment is similar to the embodiment depicted in FIG. 2, except that the joint 314 between the plug 304 and the turbine blade 312 is formed in a different fashion. As can be seen in FIGS. 4 and 5, the plug 304 includes a peripheral surface 322 formed with a plurality of external threads 324 thereon, and the hole 308 formed in the turbine blade 312 is formed with a plurality of internal threads 328 that cooperate threadably with the external threads 324. The plug 304 is of a substantially cylindrical configuration whereby the external surface 316 and the internal surface 318 are both substantially circular and planar, yet are of substantially the same diameter.

The method depicted in FIGS. 4 and 5 is different than the method depicted in FIG. 2 inasmuch as the bonding catalyst is applied to the uppermost gap 332 between the turbine blade 312 and the plug 304 in the vicinity of the external surface 316. In such a situation, the bonding catalyst is preferably in the form of a powder, putty, or other form that can be manually applied, as compared with a bonding catalyst in the form of a plated coating.

Upon heating the bonding catalyst (FIG. 5), the melted bonding catalyst flows around the circumference of the gap 332 and between the peripheral surface 322 of the plug 304 and the turbine blade 312. In this regard, it is understood that at least a nominal space (not shown) exists between the external threads 324 of the plug 304 and the internal threads 328 of the turbine blade 312, and that the melted bonding catalyst flows by wicking action into such space to wet a substantial portion of the peripheral 322 and to form the joint therein. This space may be specifically tailored to the particular bonding catalyst employed as well as tailored to the alloys used for the turbine blade 312 and the plug 304, as well as tailored to other appropriate factors. The heating is continued until the prescribed bond is created between the plug 304 and the turbine blade 312 to form the joint 314 therebetween.

The fourth embodiment, as depicted in FIGS. 4 and 5, provides the mechanical advantage of threads for holding the plug 304 within the hole 308, and additionally is extremely cost advantageous inasmuch as the bonding catalyst is applied in a simple manual step. It is additionally understood that the plug 304 may be pre-cooled or may be of a greater coefficient of thermal expansion than that of the turbine blade 312. It is further understood that the uppermost portion of the gap 332 is exaggerated in FIGS. 4 and 5 for the purpose of illustration.

Figure 6:
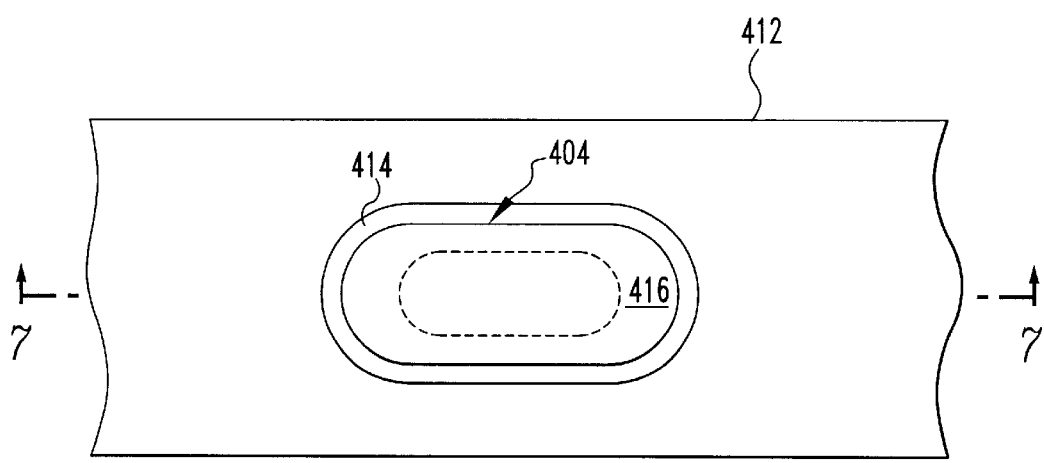
FIG. 6 is a top plan view of a fifth type of plug used to seal a hole in a turbine blade in accordance with the method of the present invention.
Figure 7:
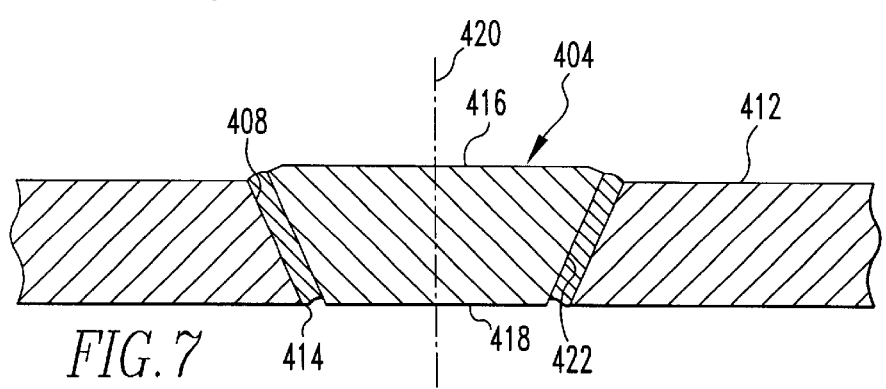
FIG. 7 is a sectional view as taken along line 7—7 of FIG. 6.

A fifth embodiment of the method of the present invention is indicated generally in FIGS. 6 and 7. The method depicted in FIGS. 6 and 7 is similar to the method depicted in FIG. 1, except that the hole 408 formed in the turbine blade 412 is of an elongated configuration, rather than being cylindrical, and thus requires a plug 404 that is of a similarly elongated configuration. As can be seen in FIGS. 6 and 7, the plug 404 and the hole 408 each have a length greater than its width, whereby the external surface 416 and the internal surface 418 are each of a planar configuration having a length greater than width, with the ends thereof being rounded. The plug 404 additionally is tapered with respect to a longitudinal axis depicted generally by the line 420 in FIG. 7.

The hole 408 is machined or otherwise worked to correspond with the peripheral configuration provided by the peripheral surface 422. which is generally smooth, arcuate, tapered, and free of threads. In this regard, it is understood that the plug 404 depicted in FIGS. 6 and 7 is merely one of an infinite variety of plugs 404 that are tapered with respect to the longitudinal axis 420, yet have a non-circular cross section as measured with respect to a plane oriented perpendicular with the longitudinal axis 420.

One or both of the plug 404 and the hole 408 are treated with the bonding catalyst, or the bonding catalyst is interposed therebetween, and the bonding catalyst is than appropriately treated by heating or other appropriate method to cause the bonding catalyst to bond the plug 404 to the turbine blade 412 and to form a joint 414 therebetween. It is likewise understood that the plug 404 may be pre-cooled or may be configured to have a higher coefficient of thermal expansion than the turbine blade 412.

From the foregoing, it can be seen that the methods presented herein permit a hole in a superalloy turbine blade to be sealed by bonding a superalloy plug within the hole. The plug is bonded to the turbine blade without welding, thereby obviating the problems that typically occur in an attempt to weld a superalloy material. The method can be practiced with any of a wide variety of plug and hole configurations, and can employ numerous types of bonding catalysts to produce appropriate types of joints to bond the plugs within the holes. The methods set forth herein thus provide an improved method of sealing holes in turbine blades while avoiding many of the problems heretofore experienced in attempting to seal such holes.

One example, among many, of some alloys having different coefficients of thermal expansion that may be employed in forming the turbine blade and the plug would include Alloy 738 (IN738) that is available from PCC Airfoils, Inc., of Cleveland, Ohio, USA, and Inco Alloy 625 (IN625) manufactured by Special Metal Corporation of Huntington, W.Va., USA. Alloy 738 has a coefficient of thermal expansion of $15.9 \times 10^{-6}/°$ Centigrade over a range of 0–1000° C. and Inco Alloy 625 has a coefficient of thermal expansion of $16.6 \times 10^{-6}/°$ Centigrade over a range of 0–1000° C. If the turbine blade is manufactured out of IN738 and the plug manufactured out of IN625, and the turbine blade and the plug are heated to 1000° C., one theoretical configuration in which the hole and the plug have zero clearance or gap therebetween would achieve approximately 98 MPa of compressive force between the plug and the turbine blade. It is understood, of course, that the turbine blade and the plug likely would not be configured with zero clearance therebetween, and such results depend upon the specific angle of taper of the plug and the hole.

If a different alloy such as Nimonic Alloy 75 (also manufactured by Special Metal) having a coefficient of thermal expansion of $18.7 \times 10^{-6}/°$ Centigrade over a range of 0–1000° C. were substituted for the IN625 in the example above, the compressive force would be even higher and would approach the yield strength of the IN738 used to manufacture the turbine blade. As such, this latter example would serve to illustrate some of the limitations in selecting materials used to manufacture the turbine blade and the plug.

While a number of particular embodiments of the method of the present invention have been described herein, it is understood that various changes, additions, modifications, and adaptations may be made without departing from the scope of the present invention, as set forth in the following claims.

What is claimed is:

1. A method of closing a core printout hole in a superalloy turbine blade, the method comprising the steps of:
   providing a superalloy plug having a given peripheral configuration;
   forming the hole to have a configuration that is structured to cooperatively receive the plug therein and to form a mechanical lock therebetween;
   receiving the plug in the hole; and
   bonding the plug to the turbine blade.

2. The method as set forth in claim 1, in which the step of providing a superalloy plug includes the step of providing a superalloy plug having a threaded peripheral configuration.

3. The method as set forth in claim 2, in which the step of providing a superalloy plug includes the step of providing a superalloy plug having a tapered peripheral configuration with respect to a longitudinal axis of the plug with a gap distance of about 1–4 mils between the plug and turbine blade along at least a portion of the plug length.

4. The method as set forth in claim 1, in which the step of bonding includes the steps of applying a bonding catalyst to at least one of the plug and the turbine blade and heating the bonding catalyst.

5. The method as set forth in claim 4, in which the step of heating the bonding catalyst includes the steps of at least partially melting the bonding catalyst and causing the bonding catalyst to flow into a gap between the plug and the turbine blade.

6. The method as set forth in claim 1, in which the step of bonding the plug includes the steps of forming one of a diffusion braze joint, a liquid phase diffusion sintering joint, and a transient liquid phase joint between the plug and the turbine blade.

7. The method as set forth in claim 1, in which the turbine blade has a first coefficient of thermal expansion, and in which the step of providing a superalloy plug includes the step of providing a superalloy plug having a second coefficient of thermal expansion that is greater than the first coefficient of thermal expansion.

8. The method as set forth in claim 1, further comprising the step of pre-cooling the plug.

9. A method of closing a core printout hole in a superalloy turbine blade, the method comprising the steps of:
   providing a superalloy plug having a threaded peripheral configuration;
   forming the hole to have a threaded configuration that is structured to receive the plug therein;
   receiving the plug in the hole;
   applying a bonding catalyst to at least one of the plug and the turbine blade in the vicinity of the hole; and
   forming a joint between the plug and the turbine blade.

10. The method as set forth in claim 9, in which the step of providing a superalloy plug having a threaded peripheral configuration includes the step of providing a superalloy plug having a tapered peripheral configuration with respect to a longitudinal axis of the plug.

11. The method as set forth in claim 9, which the turbine blade has a first coefficient of thermal expansion, and in which the step of providing a superalloy plug includes the step of providing a superalloy plug having a second coefficient of thermal expansion that is greater than the first coefficient of thermal expansion.

12. The method as set forth in claim 9, which the step of providing a superalloy plug includes the step of providing a superalloy plug having a tapered peripheral configuration with respect to a longitudinal axis of the plug.

13. The method as set forth in claim 12, in which the step of providing a superalloy plug having a tapered peripheral configuration includes the step of providing a superalloy plug having a non-circular cross-section with respect to a plane oriented perpendicular to the longitudinal axis of the plug.

14. The method as set forth in claim 12, in which the step of forming a joint includes at least one of the steps of heating the bonding catalyst and compressing the plug into the hole.

15. The method as set forth in claim 9, in which the step of bonding the plug includes the step of forming one of a braze joint, a diffusion braze joint, a liquid phase diffusion sintering joint, a transient liquid phase joint, and a diffusion bond joint between the plug and the turbine blade.

16. The method as set forth in claim 9, further comprising the step of pre-cooling the plug.

17. A method of closing a core printout hole in a superalloy turbine blade having a first coefficient of thermal expansion, the method comprising the steps of:

providing a superalloy plug having a tapered peripheral configuration with respect to the longitudinal axis of the plug and having a second coefficient of thermal expansion that is greater than the first coefficient of thermal expansion;

forming the hole to have a configuration that is structured to receive the plug therein;

receiving the plug in the hole; and bonding the plug to the turbine blade.

18. The method as set forth in claim 17, in which the step of providing a superalloy plug having a tapered peripheral configuration includes the step of providing a superalloy plug having a non-circular cross-section with respect to a plane oriented perpendicular to the longitudinal axis of the plug.

19. The method as set forth in claim 17, in which the step of providing a superalloy plug includes the step of providing a superalloy plug having a threaded peripheral configuration.

20. The method as set forth in claim 17, in which the step of bonding includes the steps of applying a bonding catalyst to at least one of the plug and the turbine blade and heating the bonding catalyst.

21. The method as set forth in claim 17, in which the step of bonding the plug includes the step of forming one of a braze joint, a diffusion braze joint, a liquid phase diffusion sintering joint, a transient liquid phase joint, and a diffusion bond joint between the plug and the turbine blade.

22. A method of closing a core printout hole in a superalloy turbine blade, the method comprising the steps of:

providing a superalloy plug having a given peripheral configuration;

forming the hole to have a configuration that is structured to cooperatively receive the plug therein;

pre-cooling the plug to a temperature lower than that of the turbine blade;

receiving the plug in the hole; and bonding the plug to the turbine blade.

23. The method as set forth in claim 22, in which the step of providing a superalloy plug includes the step of providing a superalloy plug having a tapered peripheral configuration with respect to a longitudinal axis of the plug.

24. The method as set forth in claim 23, in which the step of providing a superalloy plug having a tapered peripheral configuration includes the step of providing a superalloy plug having a non-circular cross-section section with respect to a plane oriented perpendicular to the longitudinal axis of the plug.

25. The method as set forth in claim 22, in which the step of bonding includes the steps of applying a bonding catalyst to at least one of the plug and the turbine blade and heating the bonding catalyst.

26. The method as set forth in claim 22, in which the step of bonding the plug includes the step of forming one of a braze joint, a diffusion braze joint, a liquid phase diffusion sintering joint, a transient liquid phase joint, and a diffusion bond joint between the plug and the turbine blade.

* * * * *